United States Patent [19]

Nelson et al.

[11] Patent Number: 4,503,125
[45] Date of Patent: Mar. 5, 1985

[54] PROTECTIVE OVERCOATING FOR MAGNETIC RECORDING DISCS AND METHOD FOR FORMING THE SAME

[75] Inventors: Carl W. Nelson; Michael B. Vye, both of Santa Cruz, Calif.

[73] Assignee: Xebec, Inc., San Jose, Calif.

[21] Appl. No.: 270,686

[22] Filed: Jun. 5, 1981

Related U.S. Application Data

[63] Continuation of Ser. No. 080,481, Oct. 1, 1979, abandoned.

[51] Int. Cl.$^3$ .............................................. G11B 5/72
[52] U.S. Cl. .................... 428/408; 360/135; 427/131; 427/132; 428/611; 428/634; 428/694; 428/695; 428/900; 428/928; 428/579
[58] Field of Search ................ 204/192 C, 192 M; 360/135; 346/137; 428/900, 694, 695, 692, 611, 634, 928, 579; 427/131, 132

[56] References Cited

U.S. PATENT DOCUMENTS

| | | | |
|---|---|---|---|
| 3,471,272 | 10/1969 | Wilhelm et al. | 427/129 |
| 3,472,751 | 10/1969 | King | 118/49.1 |
| 4,052,738 | 10/1977 | Hosomi et al. | 204/192 C |
| 4,069,360 | 1/1978 | Yanagisawa et al. | 428/64 |
| 4,224,381 | 9/1980 | Patel et al. | 427/131 |
| 4,411,963 | 10/1983 | Aine | 428/694 |

FOREIGN PATENT DOCUMENTS

| | | | |
|---|---|---|---|
| 2461997 | 3/1981 | France | 427/131 |
| 0033521 | 10/1979 | Japan | 428/408 |

*Primary Examiner*—Ellis P. Robinson
*Attorney, Agent, or Firm*—James H. Laughlin, Jr.

[57] ABSTRACT

A protective overcoating is disclosed for a magnetic alloy thin-film recording disc that includes a magnetic alloy film formed on a disc-shaped substrate or coated substrate. The protective overcoating is formed by first sputtering onto the magnetic medium an interfacial layer of titanium, and then sputtering onto the titanium a layer of carbon. The sputtered carbon provides wear-resisting lubricity, while the titanium interface promotes the adhesion of the sputtered carbon to the magnetic medium of the recording disc.

6 Claims, No Drawings

PROTECTIVE OVERCOATING FOR MAGNETIC RECORDING DISCS AND METHOD FOR FORMING THE SAME

This application is a continuation of application Ser. No. 080,481, filed 10/1/79, now abandoned.

FIELD OF THE INVENTION

The present invention generally relates to the field of magnetic recording discs for storing digital information, and more particularly, to protective overcoatings for such recording discs. In even greater particularly the present invention relates to protective overcoatings for magnetic alloy thin-film recording discs.

BACKGROUND OF THE INVENTION

Thin-film, magnetic recording discs are widely used in the computer industry as a means for storing large amounts of digital data. Data are written onto and read off of a rapidly rotating recording disc by means of a magnetic head transducer assembly that flies closely over the disc. The most commonly used recording discs are of the type that include a magnetic oxide dispersion layer formed on a substrate or coated substrate. As an example, an iron oxide recording disc includes a dispersion of ferrimagnetic iron (III) oxide ($\gamma$-$Fe_2O_3$) micropowders in an epoxy resin binder. As is well known in the art, $\gamma$-$Fe_2O_3$ dispersions exhibit an acicular quality that imposes a limit upon the maximum digital storage density for iron oxide recording discs.

In order to provide magnetic recording discs with higher digital storage densities, magnetic alloy thin-film recording discs, which include a magnetic alloy formed on a substrate or coated substrate, have been developed. The magnetic medium is formed from ferrimagnetic alloys of high coercivity, such as magnetic cobalt alloys. As an example, one commercially available, magnetic alloy thin-film recording disc has a magnetic medium comprised of a micro-crystalline, ferrimagnetic cobalt-nickel alloy. A thin film of the cobalt-nickel is formed on a coated disc substrate comprised of an aluminum or aluminum alloy substrate coated with a non-ferrimagnetic nickel alloy.

Since the linear, digital recording density for any magnetic recording disc depends not only on the nature and thickness of the magnetic recording medium and the characteristics of the magnetic head, but also on the head-to-medium spacing, higher digital recording densities can be achieved by flying a magnetic head very closely (on the order of submicrons) over the surface of a recording disc. However, the extremely close operational spacing between a rotating recording disc and a magnetic head, as well as the start-stop operations of the magnetic recording system, result in an amount of head-disc dynamic contact that imposes severe wear-resisting requirements on the recording disc. The surface of the recording disc must exhibit a substantial degree of lubricity to insure a low coefficient of friction between the magnetic head and the surface of the recording disc, and thereby prevent the excessive wearing of the disc surface.

For recording discs of iron (III) oxide, chromium (IV) oxide, and other magnetic oxides, the necessary lubricating properties are typically provided by a lubricating polymer coating that binds to the epoxy of the magnetic oxide dispersion. However, in the case of a magnetic alloy thin-film recording disc, such as that noted above, no lubricating polymer has been found that adequately binds to the thin-film magnetic medium.

In order to provide the necessary lubricating boundary layer between the disc surface and the magnetic recording head, one approach has been to form a protective overlayer of rhodium over the magnetic medium. During the operation of the magnetic recording system, the rhodium overlayer reacts with organic vapors present in the environment, even in trace concentrations, to form amorphous organic deposits on the surface of the rhodium. The organic vapors are absorbed at the surface of the rhodium, where they undergo polymerization as a result of frictional activation during head-disc dynamic contact. This frictional activation process results in an accumulation of organic deposits that resemble mixed polymers in their properties, which are thus termed frictional polymers.

Initially, the frictional polymers deposited on the disc surface comprise thin, oily translucent films that provide remarkably effective lubrication. However, with the continued operation of the magnetic recording system and the resulting continued frictional activation, these frictional polymers further polymerize and become transformed into gummy layers. In this state, the frictional polymers cease to provide effective lubrication, resulting in the excessive wearing of the surface of the recording disc, the sticking of the magnetic head to the disc surface during static head-disc contact, and the aerodynamic instability of the magnetic head. The rate of buildup of the frictional polymers is difficult to predict, being determined by a number of factors such as the type and amount of organic vapors present in the environment, the rate of rotation of the disc, and the number of start-stop operations of the magnetic recording system.

The inability to control the buildup of non-lubricating organic deposits on the surface of the recording disc is a principal, if not the principal, disadvantage of rhodium-plated, magnetic recording discs. If, on the one hand, organic vapors are completely excluded from the disc environment, excessive wear of the disc surface occurs because of the loss of the lubrication provided by the frictional polymers. If, on the other hand, organic vapors are present, in however small concentrations, excessive buildup of the frictional polymer deposits inevitably occurs, particularly at the higher temperatures and higher rotational velocities associated with efficient disc storage operations, leading to the problems noted previously and eventually to the failure of the recording disc. At the present time, attempts to partially deactivate the rhodium overlayer in order to inhibit the formation of frictional polymers have been unsuccessful, as has been the search for a stable lubricating frictional polymer.

It is therefore a general object of the present invention to provide a wear-resistant, protective overcoating for a magnetic alloy thin-film recording disc and a method for forming the same. To this end, it is a specific object of the present invention to provide a protective overcoating that exhibits a high degree of lubricity and is effective adhered to the underlying magnetic medium.

Another object of the present invention is to provide such a protective overcoating that substantially does not catalyze the formation of frictional polymers on the surface thereof.

SUMMARY OF THE INVENTION

Briefly, to achieve these objects and others that will be apparent to those of ordinary skill in the art, the present invention provides a protective overcoating for a magnetic alloy thin-film recording disc, and a method for forming the same. The protective overcoating includes a layer of sputtered carbon and an interfacial layer of material bondable to the material of the magnetic medium of the recording disc and to carbon. In order to form the protective overcoating, the interfacial layer is formed over the magnetic medium so as to become bonded thereto. The carbon layer is then applied over the interfacial layer by sputter deposition. As a result, the sputtered carbon is adhered to the magnetic medium, forming a lubricious, wear-resisting surface for the magnetic recording disc. In addition to being strongly adhered to the underlying magnetic medium and providing lubricity, the carbon surface layer does not catalyze the formation of frictional polymers, but rather retains its lubricity for an extended operational lifetime. For a preferred embodiment, in which the magnetic medium of the recording disc comprises a cobalt-nickel alloy film, the interfacial layer is titanium that is formed over the cobalt-nickel magnetic medium by sputter deposition.

DESCRIPTION OF THE PREFERRED EMBODIMENT

In accordance with a preferred embodiment of the present invention, a protective overcoating for a magnetic alloy thin-film recording disc is hereinafter described in relation to a recording disc that includes a coated substrate comprising an aluminum or aluminum alloy substrate with a non-magnetic nickel alloy coating, and a magnetic medium composed of a cobalt-nickel film that is formed over the nickel-coated aluminum substrate. However, those of ordinary skill in the art will recognize that the principles of the present invention are applicable to any magnetic alloy thin-film recording disc that includes any suitable substrate (or coated substrate) over which is formed a magnetic alloy film. Also, any indications of substrate or coating thicknesses are meant to be illustrative only.

In order to form the magnetic recording disc, the aluminum or aluminum alloy substrate is machined and ground and then coated on both sides with an amorphous (or extremely micro-crystalline) non-ferrimagnetic nickel-phosphorus alloy formed by electroless deposition from an aqueous solution. Typically, the thickness of the substrate is 0.5 to 0.6 cm, while that of the electroless nickel coating is approximately 0.005 to 0.01 cm. The surfaces of the nickel-coated aluminum substrate are lapped and chemically cleaned, and then coated on both sides with a layer of a micro-crystalline ferrimagnetic cobalt-nickel-phosphorus alloy formed by electrolytic deposition from an aqueous solution. The thickness of the cobalt-nickel typically is less than one micron (usually 0.1 to 0.5 microns).

The protective overcoating for the recording disc includes a layer of sputtered carbon and an interfacial layer of titanium. The titanium interfacial layer is first formed on the magnetic medium of the recording disc, with the carbon surface layer being formed on the surface of the titanium by sputter deposition.

The thickness of the titanium interfacial layer is not critical. By way of illustration, a thickness of 0.05 to 0.125 microns has been found to provide effective adherence of the sputtered carbon layer to the underlying magnetic medium. To a point, the thickness of the sputtered carbon layer is also non-critical. However, if the thickness of the carbon is reduced significantly below 0.1 microns, the lubricating properties of the carbon are reduced resulting in a higher coefficient of friction and increased wearing.

The interfacial layer of titanium acts to facilitate the adherence of the sputtered carbon to the cobalt-nickel magnetic layer. Titanium was chosen for a preferred embodiment because it is a reactive metal that bonds effectively to both cobalt-nickel and carbon. The titanium forms a diffusion interface with the cobalt-nickel magnetic medium, with the sputtered carbon layer bonding to the titanium and, thereby, becoming adhered to the underlying cobalt-nickel magnetic medium.

For a preferred embodiment, the protective overcoating for a magnetic alloy thin-film recording disc is formed as follows. The titanium interfacial layer is formed on the cobalt-nickel magnetic medium (after a suitable cleaning process) by the sputter deposition of titanium from a titanium target in a low-pressure argon gas discharge. Maximum adhesion of the sputtered titanium interfacial layer to the magnetic medium is obtained by first sputter cleaning (also known as sputter etching) the surface of the cobalt-nickel prior to the sputter deposition of the titanium.

Once the titanium interfacial layer is sputtered onto the surface of the recording disc (i.e., onto the cobalt-nickel magnetic medium), the carbon surface layer of the protective overcoating is then deposited by sputter deposition from a carbon target in a low-pressure argon gas discharge. The sputtered carbon bonds to the sputtered interfacial layer of titanium and is thereby effectively adhered to the underlying magnetic medium of the recording disc.

The sputter deposition of the carbon-titanium protective overcoating can be accomplished by either DC or RF (radio-frequency) sputtering. Care must be taken to eliminate all residual active gases from the sputtering system. That is because active gases in a glow discharge provide a very reactive chemical medium for both titanium and carbon, with the titanium readily forming deposits of oxides, nitrides, and hydrides, and with the carbon forming $CO$, $CO_2$, $CH_4$, and $C_2N_2$ gases. If the titanium layer is allowed to become reacted (i.e., an active gas or gases are chemically absorbed to form a stable compound or a combination of compounds), an effective diffusion barrier is formed at the surface of the titanium, thereby preventing the formation of a diffusion interface with the sputtered carbon. This, of course, adversely affects the adhesion of the carbon layer to the titanium interfacial layer, and thereby to the surface of the recording disc.

Accordingly, while the sputter deposition of the titanium and the carbon is not conducted at an ultra high vacuum, but rather in the pressure range of 0.002 to 0.02 torr, nevertheless it is important that the vacuum environment in which the sputtering of the titanium and particularly the carbon takes place be kept extremely clean. The background gas in the sputtering system should consist substantially entirely of an inert gas such as argon, and should not contain any residual air, water vapor, hydrocarbons, or other contaminates.

The preferred embodiment of a protective overcoating for a magnetic alloy thin-film recording disc provides a durable and wear-resistant surface for the recording disc. The sputtered carbon surface layer is effectively adhered to the disc (i.e., to the cobalt-nickel magnetic medium of the disc) by means of the interfacial layer of titanium. The sputtered carbon surface layer exhibits a high degree of lubricity; the lubricity of the carbon together with its resistance to the formation of frictional polymers, makes a magnetic alloy thin-film recording disc provided with the protective overcoating of the present invention significantly more durable, wear-resistant, and reliable than such recording discs protected by other techniques, such as rhodium-plated discs utilizing frictional polymers for lubricity.

While the invention has therefore been described with respect to a preferred embodiment, it is to be clearly understood by those of ordinary skill in the art that the invention is not limited thereto, but rather that the limits of the invention are to be interpreted only in conjunction with the appended claims.

The embodiments of the invention in which an exclusive property or privilige is claimed are as follows:

1. A protective overcoating for a magnetic alloy thin-film recording disc that includes a disc-shaped base over which is formed a magnetic alloy film to provide a magnetic recording medium, comprising:
  a. an interfacial layer of titanium bondable to both the magnetic medium of the recording disc and to carbon; and
  b. a layer of carbon formed by sputter deposition over said interfacial layer.

2. The protective overcoating defined in claim 1 wherein said interfacial layer comprises a layer of titanium formed by sputter deposition.

3. A magnetic recording disc comprising:
  a. a disc-shaped base;
  b. a film of a cobalt ferrimagnetic alloy formed on said base so as to provide a magnetic recording medium;
  c. an interfacial layer of titanium bondable to both the cobalt ferrimagnetic alloy and to carbon; and
  d. a layer of carbon formed by sputter deposition over said interfacial layer.

4. The magnetic recording disc defined in claim 3 wherein said base comprises:
  a. a substrate comprising aluminum; and
  b. a coating of a nonmagnetic nickel alloy formed on said substrate.

5. A method for forming a protective overcoating for a magnetic recording disc of the type having a disc-shaped base over which is formed a magnetic alloy film to provide a magnetic recording medium, comprising the steps of:
  a. forming onto the magnetic medium an interfacial layer of titantium bondable to the magnetic medium and to carbon; and
  b. thereafter, sputtering a layer of carbon onto said interfacial layer.

6. The method defined in claim 5 wherein the step of forming onto the magnetic medium an interfacial layer comprises the step of:
  a. sputtering onto the magnetic medium an interfacial layer of titanium bondable to the magnetic medium and to carbon.

* * * * *